United States Patent
Kurdziel

(10) Patent No.: US 7,690,691 B2
(45) Date of Patent: Apr. 6, 2010

(54) COUPLER FOR JOINING PLASTIC AND CONCRETE PIPE

(75) Inventor: John M. Kurdziel, Fort Wayne, IN (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 631 days.

(21) Appl. No.: 11/651,162

(22) Filed: Jan. 11, 2007

(65) Prior Publication Data

US 2008/0169645 A1  Jul. 17, 2008

(51) Int. Cl.
*F16L 49/00* (2006.01)
(52) U.S. Cl. .................. 285/230; 285/419; 285/903
(58) Field of Classification Search ............... 285/903, 285/230, 412, 411, 419, 373, 367, 410
See application file for complete search history.

(56) References Cited

U.S. PATENT DOCUMENTS

| | | | | | |
|---|---|---|---|---|---|
| 928,896 | A | * | 7/1909 | Bille ............................ | 285/412 |
| 1,313,667 | A | * | 8/1919 | Benz ............................ | 285/330 |
| 2,221,803 | A | * | 11/1940 | Krobusek .................... | 137/798 |
| 2,950,930 | A | * | 8/1960 | Dunmire ...................... | 285/110 |
| 3,048,177 | A | * | 8/1962 | Takaro ........................ | 606/153 |
| 4,443,031 | A | * | 4/1984 | Borsh et al. ................. | 285/419 |
| 6,834,890 | B2 | * | 12/2004 | Sorkin ......................... | 285/230 |
| 6,899,359 | B2 | * | 5/2005 | Presby ........................ | 285/420 |
| 7,240,930 | B2 | * | 7/2007 | Stravitz ....................... | 285/419 |

* cited by examiner

*Primary Examiner*—David E Bochna
(74) *Attorney, Agent, or Firm*—Finnegan, Henderson, Farabow, Garrett & Dunner, LLP

(57) ABSTRACT

A plastic pipe coupler is provided having a plurality of sections connected to one another but with at least one gap between the ends of two sections which are adjacent to one another. Each of the coupler sections has an exterior surface and an interior surface, and is fabricated so that when taken together, the sections cooperatively circumvent a section of plastic pipe. Each bracket is secured to the exterior surface of one of the aforesaid sections of the coupler and has a base plate, a pair of sidewall plates attached to each base plate, and a crosspiece having a first end and a second end, the first end of which is in contacting relationship with one of the pair of sidewall plates, while the second end is in contacting relationship with the other of the pair of sidewall plates.

18 Claims, 8 Drawing Sheets

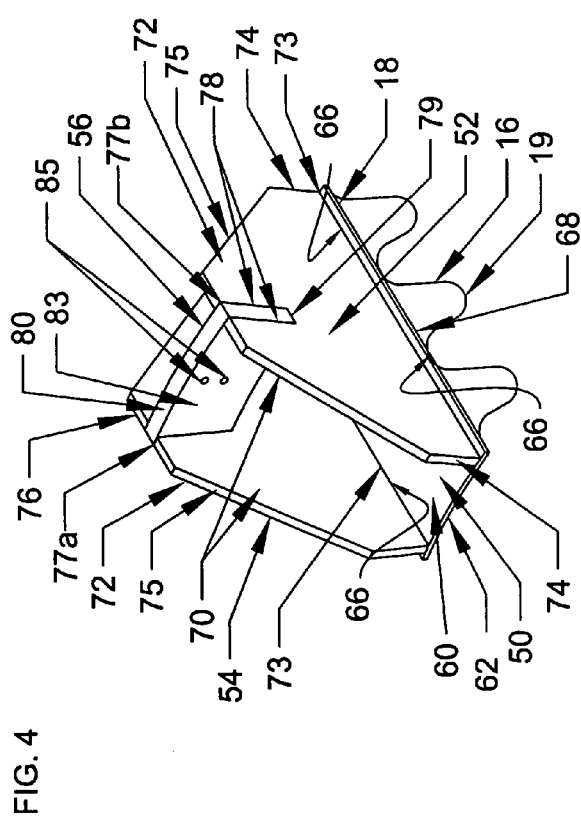

COUPLER FOR JOINING PLASTIC AND CONCRETE PIPE

BACKGROUND OF THE INVENTION

1. Field of the Invention

This invention relates generally to couplers, and more particularly, to a coupler that can mechanically join together a plastic pipe and a concrete pipe, and still more particularly a plastic pipe that is corrugated.

2. Description of the Related Art

This invention is directed to the providing of a coupler for use with plastic and concrete pipe. Over the years, there have been many couplers for joining one plastic pipe with another pipe also made from plastic. Similarly, there have been couplers that have been made to join together two pipes fabricated from concrete. However, there has never been a coupler that can mechanically join together a concrete pipe having a smooth-walled exterior and a plastic pipe, especially one that is corrugated.

Historically, concrete and plastic pipes have not been used together in the field due to the absence of mechanical connectors. Attempts at using the screw-type of coupler used with concrete pipe on plastic pipe as well could result in the tearing of the plastic pipe if the juncture of the two pipes was subjected to stress. Additionally, many job applications only permitted the use of one type of pipe, however, recently there has been some willingness on the part of some organizations charged with overseeing transportation related pipe installations to permit concrete and plastic pipe to be used in the same job installation.

For example, one place historically where only concrete pipe has been used is in culvert applications beneath roadways. Cylindrical, smooth-walled concrete pipe typically 8' in length is laid well beneath the road surface, extending from one side of the road to the other. Penultimate sections of concrete pipe are laid at opposing ends of the concrete pipe (s), with concrete culvert openings attached to the opposite free ends of the concrete conduit. Each of the concrete structures is coupled to the structure adjacent thereto using couplers well known in the concrete pipe industry. The installation process is time consuming and requires the use of manpower and equipment sufficient to move such heavy structures. By using HDPE (high density polyethylene) or other types of plastic pipe with similar characteristics to HDPE, the manpower and equipment requirements could possibly be lessened. Additionally, a longer plastic pipe (greater than 12' and normally 20' in length) could be utilized in place of several shorter concrete sections due to the weight factor. This could further reduce installation time and decrease the number of joints, thereby decreasing the number of joint leaks, as well as being cheaper due to the relative costs of the pipes involved.

It is thus apparent that the need exists for a coupler for mechanically joining concrete and plastic pipe which effectuates a watertight seal so as to be useful in culvert construction, which coupler is relatively easy to fabricate and cost effective to use.

SUMMARY OF THE INVENTION

In accordance with the present invention, there is disclosed a plastic pipe coupler having a plurality of sections connected to one another but with at least one gap between the ends of two sections which are adjacent to one another, at least two brackets, a concrete pipe fastening means, and a connector element. Each of the coupler sections has an exterior surface and an interior surface, and is fabricated so that when taken together, the sections cooperatively surround a ringed section of plastic pipe having a first outer diameter, with each interior surface associated with each section being directly adjacent the plastic pipe of a first outer diameter.

Each bracket is secured to the exterior surface of one of the aforesaid sections of the coupler adjacent a section of the coupler to which another bracket is secured. Each of the brackets has a base plate, a pair of sidewall plates attached to each base plate, and a crosspiece having a first end and a second end. The first end of each crosspiece is in contacting relationship with one of the pair of sidewall plates, while the second end of each crosspiece is in contacting relationship with the other of the pair of sidewall plates.

The concrete pipe fastening means engages a concrete pipe of a second outer diameter. The connecting element has a first end portion secured to the concrete pipe fastening means and a second end portion secured to the bracket, preferably to the crosspiece.

Preferably each section is corrugated such that it has a plurality of crowns and troughs. Some of the adjacent sections are connected to each other by hinge means, with the sections being of a first thickness and the hinge means being of a second thickness, with the first thickness being greater than the second thickness.

Each base plate is preferably welded to the exterior surface of the section of the coupler to which it is secured. Additionally, each base plate may be further secured to its respective section by fastening means which pass through apertures formed in the base plate, if these additional fastening means are used, as well as through the plastic pipe. Each base plate has an upper surface and a lower surface, with the lower surface being directly adjacent the coupler section. The upper surface of each base plate has sidewall plates, preferably two in number, projecting upwardly therefrom.

Each of the sidewall plates has a slot formed therein, with the crosspiece having its opposite ends retained in the respective slot. The crosspiece has a longitudinal axis and the base plate has a longitudinal axis, with the longitudinal axis of the crosspiece being generally perpendicular to the longitudinal axis of the base plate. The crosspiece has an aperture formed therein. The crosspiece has a first surface facing towards the concrete pipe fastening means and a second surface facing away from the concrete pipe fastening means. The connecting element passes through the crosspiece aperture. The connecting element second end portion is secured with fastening means directly adjacent the second surface of the crosspiece.

Additionally, preferably at least one coupler section has an aperture formed therein, with that aperture having fastening means passing therethrough as well as through the sidewall of the plastic pipe of the first outer diameter. This additional fastening means provides yet another securing of the section to the plastic pipe of a first outer diameter.

There is also disclosed a split coupler component of the coupling of a concrete pipe to a plastic pipe with the split coupler having a plurality of sections connected to one another but with at least one gap between the ends of two sections which are adjacent to one another, and at least two brackets. Each of the coupler sections has an exterior surface and an interior surface, and is fabricated so that when taken together, the sections cooperatively surround a corrugated plastic pipe.

Each bracket is secured to the exterior surface of one of the aforesaid sections of the coupler adjacent a section of the coupler to which another bracket is secured. Each of the brackets has a base plate, a pair of sidewall plates attached to each base plate, and a crosspiece having a first end and a second end. The first end of each crosspiece is in contacting relationship with one of the pair of sidewall plates, while the second end of each crosspiece is in contacting relationship with the other of the pair of sidewall plates, and with the crosspiece having an aperture therein.

Preferably each section is corrugated such that it has a plurality of crowns and troughs. Some of the adjacent sections are connected to each other by hinge means, with the sections being of a first thickness and the hinge means being of a second thickness, with the first thickness being greater than the second thickness.

Each base plate is preferably welded to the exterior surface of the section of the coupler to which it is secured. Additionally, each base plate may be further secured to its respective section by fastening means which pass through apertures formed in the base plate, if these additional fastening means are used, as well as through the plastic pipe. Each base plate has an upper surface and a lower surface, with the lower surface being directly adjacent the coupler section. The upper surface of each base plate has sidewall plates, preferably two in number, projecting upwardly therefrom.

Each of the sidewall plates has a slot formed therein, with the crosspiece having its opposite ends retained in the respective slot. The crosspiece has a longitudinal axis and the base plate has a longitudinal axis, with the longitudinal axis of the crosspiece being generally perpendicular to the longitudinal axis of the base plate.

The primary objective of this invention is to provide a coupler that can be used to mechanically join concrete pipe to plastic pipe.

Another objective of this invention is to provide such a coupler that is able to be fabricated using existing technology and easily installed in operative position on the two pipes to be joined.

Other objects and advantages of the invention will be apparent from the following description, the accompanying drawings and the appended claims.

BRIEF DESCRIPTION OF THE DRAWINGS

FIG. 4 is a perspective view of the bracket component of the invention.

FIG. 5 is a front elevational view of the crosspiece component of the invention.

FIG. 6 is a top plan view of the base plate component of the invention.

FIG. 7 is a vertical sectional view taken along line 7-7 of FIG. 6.

Figure 1:
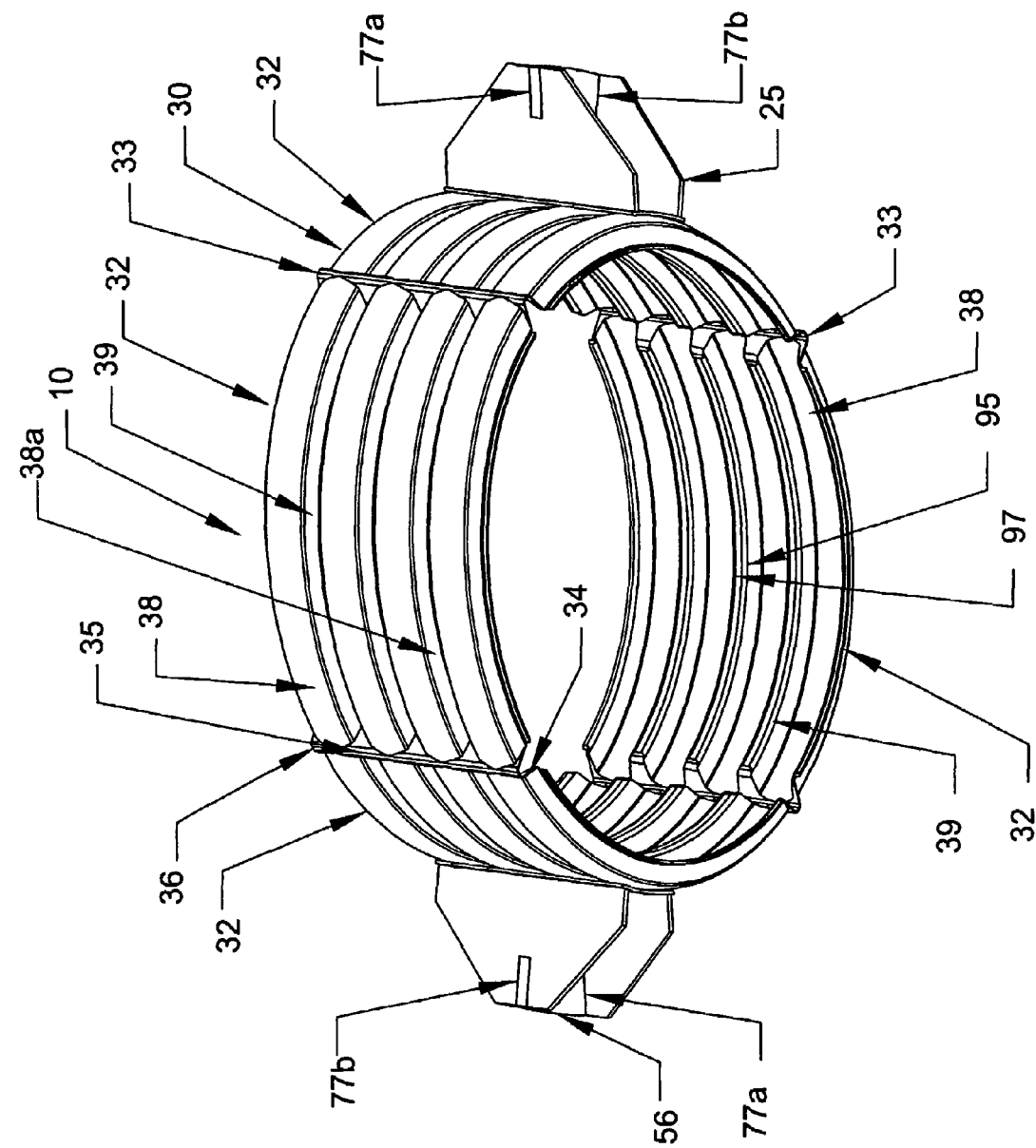
FIG. 1 is a perspective view of a main portion of a coupler made in accordance with the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Having reference to the drawings, attention is directed first to FIG. 1, which discloses the main portion of a coupler made in accordance with the invention designated generally by the numeral 10. The coupler is primarily fabricated from plastic, such as HDPE (high density polyethylene) or other extrudable, injected, or molded plastics. As can be appreciated from a comparison of FIGS. 1 and 8, the coupler 10 is adapted to join a concrete pipe 11 having an outer wall 12 and inner wall 13 at end 14 to a plastic pipe 16 with the pipe being corrugated. Each pipe corrugation 17 has associated therewith a crown 18 and a valley or trough 19.

Figure 8:
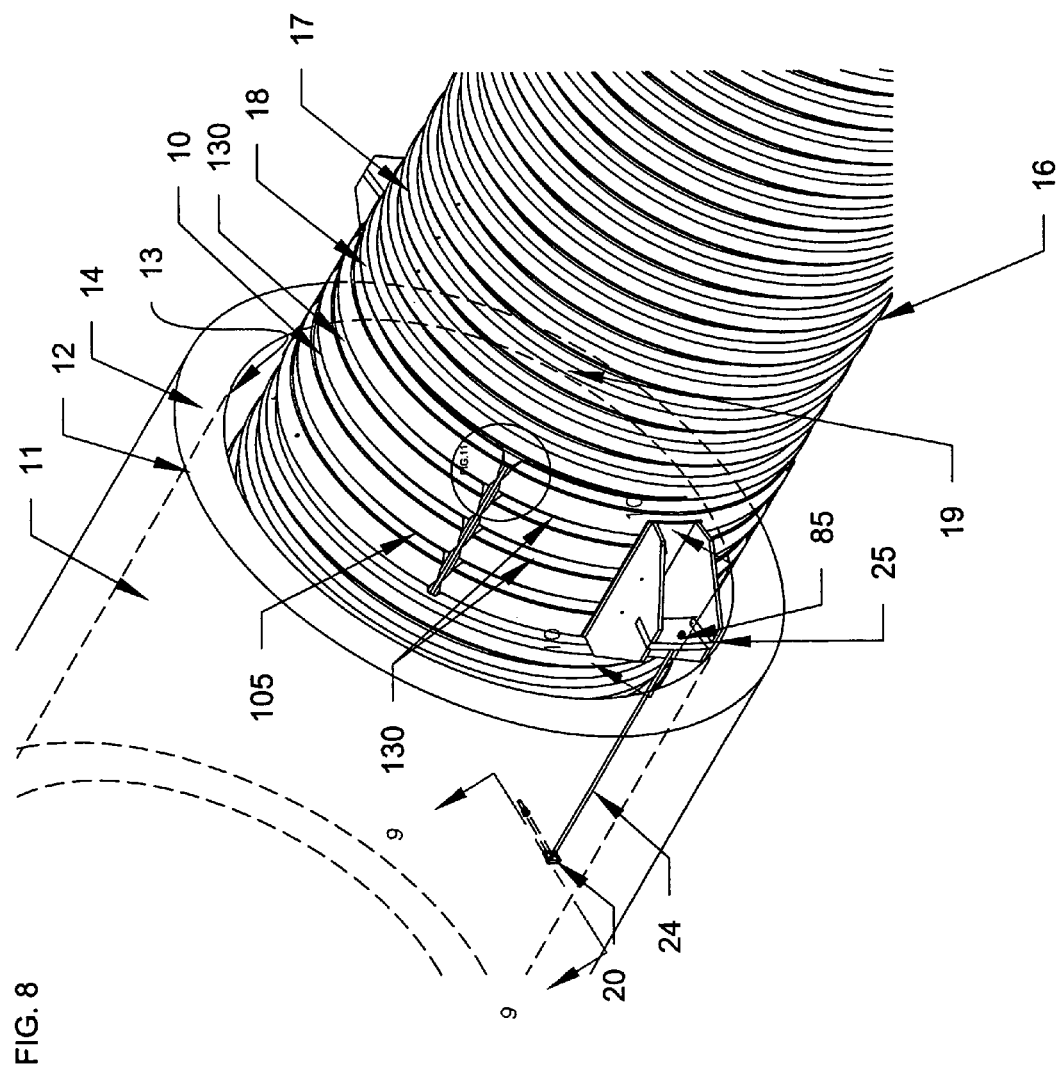
FIG. 8 is a perspective view of the coupler of the invention shown in an operative embodiment.
Figure 10:
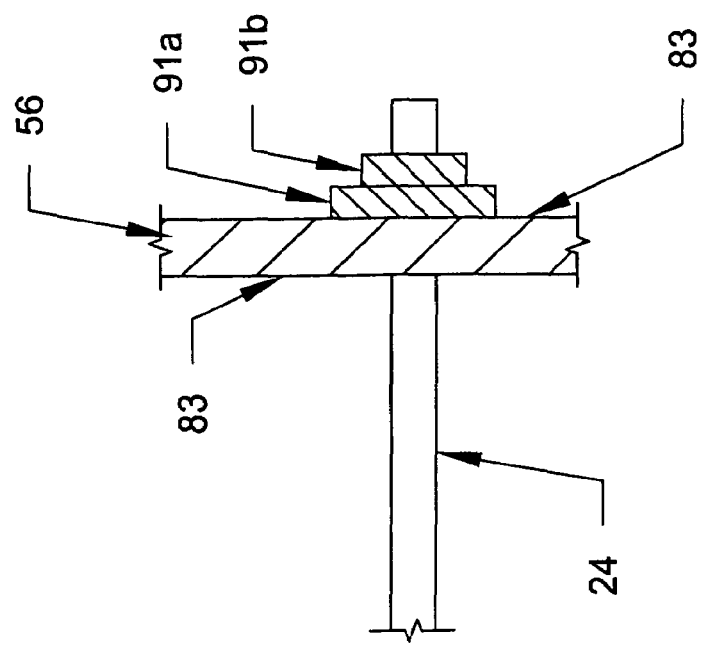
FIG. 10 is a horizontal sectional view on a greatly enlarged scale taken along line 10-10 of FIG. 8.
Figure 9:
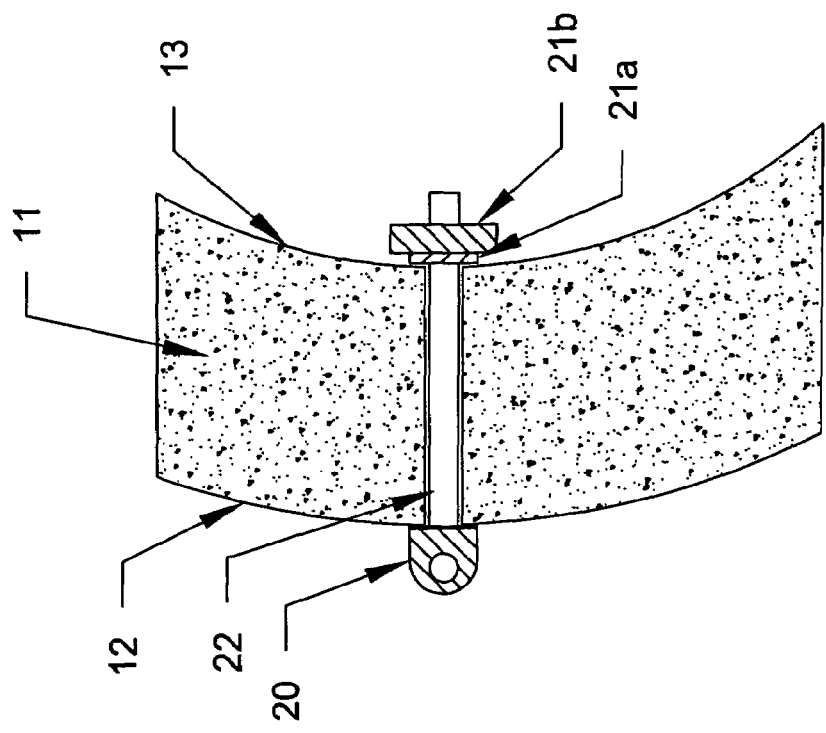
FIG. 9 is a vertical sectional view on a greatly enlarged scale taken along line 9-9 of FIG. 8.

Securing the coupler 10 to the concrete pipe 11 is accomplished by a concrete anchor 20 as can be appreciated by a comparison of FIGS. 8 and 9. The concrete anchor 20 is of the type well known in the art of concrete pipe, with the anchor being inserted through the concrete pipe from the outside thereof, and held in place adjacent to the interior wall 13 of the pipe using a washer 21a and nut 21b, with the nut typically being a hex nut. The concrete anchor 20 passes through a concrete pipe fastener channel 22 which is drilled through the sidewall of the concrete pipe 11.

The concrete pipe anchor 20 has an aperture formed in the portion of the anchor which remains outside of the concrete pipe, with this aperture having passed therethrough a rod 24, preferably threaded, or at least preferably threaded at each end. As can be seen in FIG. 8, it is this rod which provides connection between the anchor 20 on the concrete pipe and the bracket 25 on the portion of the coupler 10 which is secured to the plastic pipe 16. The rod could be fabricated from metal or plastic, the advantage of plastic being that it is corrosion resistant.

The coupler 10 as can be appreciated from a comparison of FIGS. 1, 2, 3, and 8 is of the type of coupler known as a split coupler 30, meaning that while some if not almost all of the various sections 32 have hinged interconnection portions 33 between directly adjacent sections 32, at least two directly adjacent sections have free ends 34 and 35 respectively such that a gap 36 exists therebetween. The number of sections chosen depends on how small the diameter of the plastic pipe is: the smaller the diameter, typically the fewer the sections.

Each coupler corrugation is of a first thickness from the top of the crown to the bottom of the directly adjacent valley. Similarly each hinge portion of the split coupler is of a second thickness, with the first thickness being greater than the second thickness, thus creating flexibility at the hinged interconnection portion 33 which in reality is preferably a relatively planar portion of the coupler. The width of the hinge, namely the distance between the corrugations of adjacent sections of the coupler, may be several inches, thus resembling a generally rectangular area when the coupler is opened. The width depends in part on the diameter of the coupler when closed. By having hinge portions 33, the split coupler 30 may be effectively opened and then closed to more easily encircle the pipe.

The split coupler 30 also has coupler corrugations 37 with crowns 38 and valleys 39 connected by sidewalls 38a. Thus, when the split coupler is closed around the plastic pipe, the coupler corrugations lay in the corrugations of the plastic pipe. The structure at the gap 36 can be better appreciated from a comparison of FIGS. 1, 8, 11 and 12 in which the coupler is shown as having a pair of peripheral sidewalls 105 as the outermost of the sidewalls, with each peripheral sidewall 105 having a flange 103 extending perpendicularly therefrom along the bottom of the peripheral sidewall. The flange 103 also extends along the front and rear ends of the peripheral sidewall as well and has an edge 101 contiguous with the side edges of the free ends 34 and 35 respectively.

Figure 11:
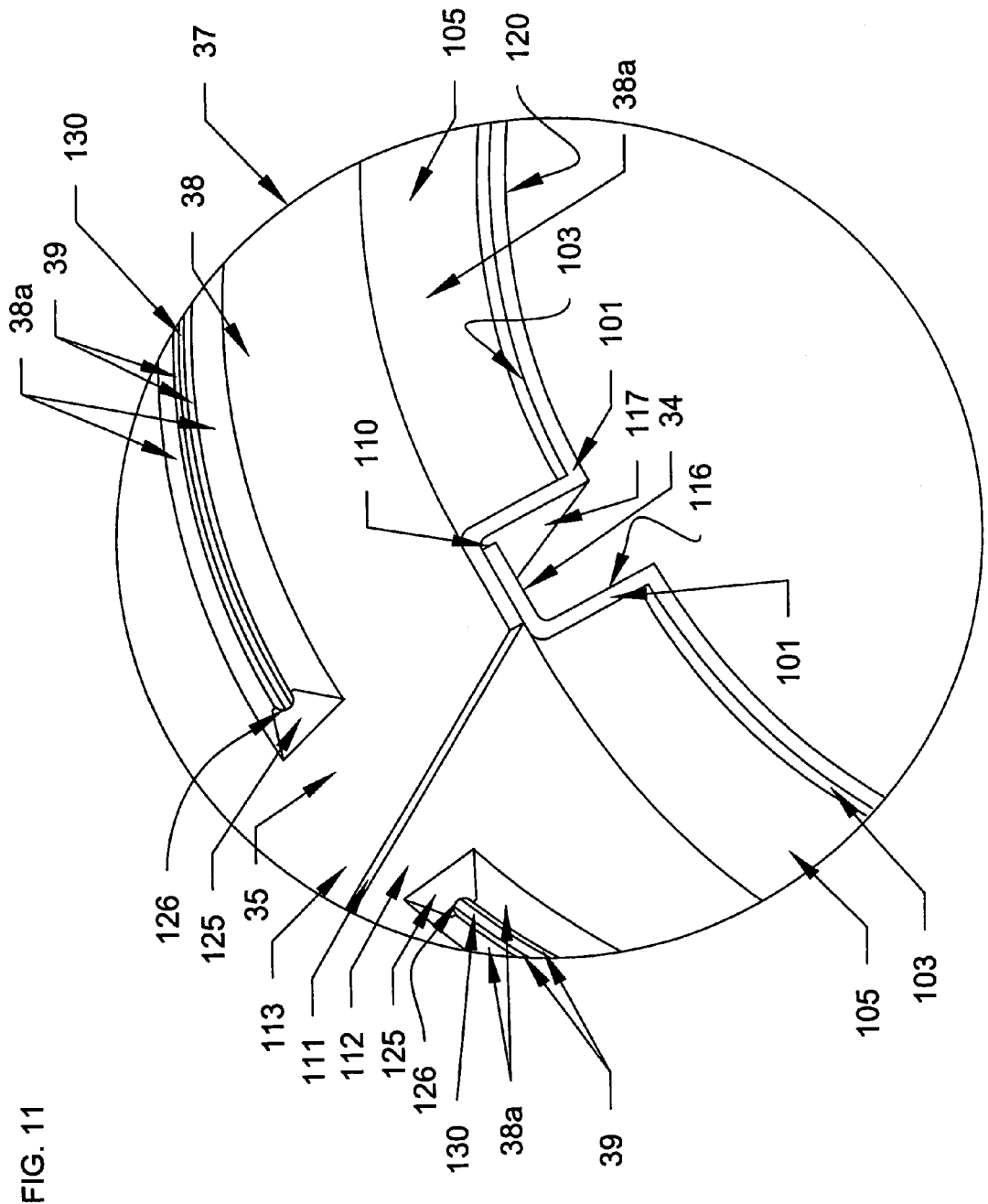
FIG. 11 is a perspective view on a greatly enlarged scale of the portion of the invention within line 11-11 of FIG. 8.
Figure 12:
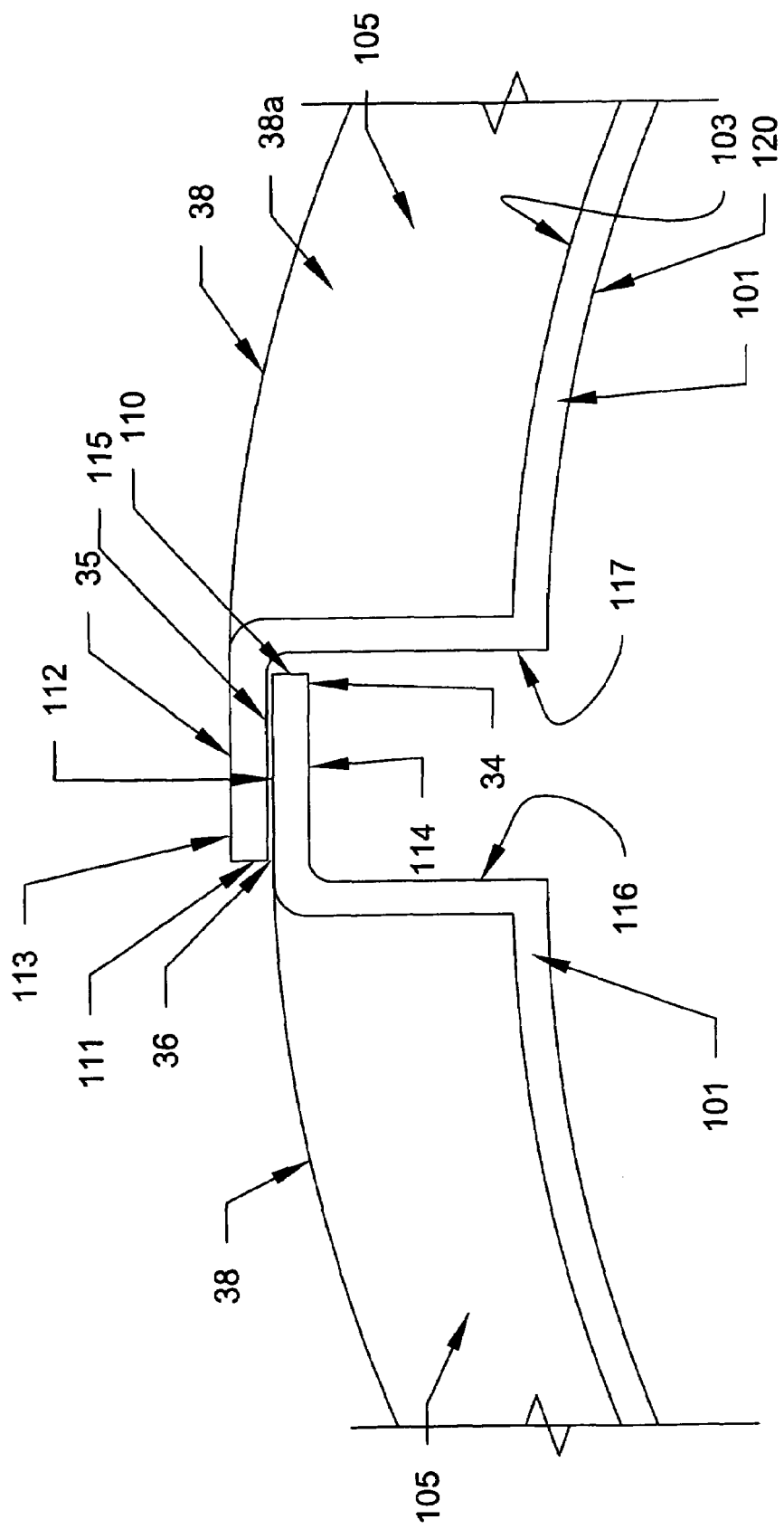
FIG. 12 is a front elevational view on a greatly enlarged scale taken at the gap in the coupler shown in FIG. 2.

As can best be appreciated from a comparison of FIGS. 1, 11, and 12, the free ends 34 and 35 each have an end edge 110 and 111 respectively that extends between the aforementioned side edges of the free ends. The two free ends also have a top surface 112 and 113 respectively, each of which is preferably planar. The two free ends also have a bottom surface 114, 115 respectively, each of which is preferably planar and parallel to the respective top surfaces 112 and 113. The two free ends each has a connecting surface 116 and 117 respectively substantially opposed to each other with connecting surface 116 extending between the bottom surface of free end 34 and interior surface 120 of the coupler, while connecting surface 117 extends between the bottom surface of free end 35 and interior surface 120 of the coupler. As is disclosed in the drawings, preferably the free ends overlap one another. Furthermore, it should be realized that as the coupler is extruded, by cutting at the portions of the extrudate which otherwise would constitute one of the hinged portions, the free ends are created.

Still further, opposite ends of each valley on the exterior surface of the strip coupler also have a groove endwall 125 as can be seen in FIG. 11. Each groove endwall is thus located directly adjacent to each hinge member and each free end. Preferably, each groove endwall 125 has formed therein a groove aperture 126 which extends completely through the coupler substantially along the elongate axis of the valley.

In the preferred embodiment of the invention, a band or strap 130 of polyethylene or other similar material is laid in one or more of the grooves in the coupler (e.g. one band is shown in each of the three grooves of the coupler shown in FIG. 8) and inserted through each of the groove apertures 126 and finally secured to itself to form a supplemental band 130 around the coupler as can be appreciated from a comparison of FIGS. 8 and 11. Alternatively, the bands could just be laid in the grooves and made to pass beneath each of the brackets 25 before having the ends of the band secured to each other.

A comparison of FIGS. 1-8 better discloses the structure of bracket 25. There are at least two brackets 25 utilized with the coupler 10 of this invention. Each bracket has a bracket base 50, a pair of bracket sidewalls 52 and 54 respectively, and a bracket crosspiece 56.

Figure 2:
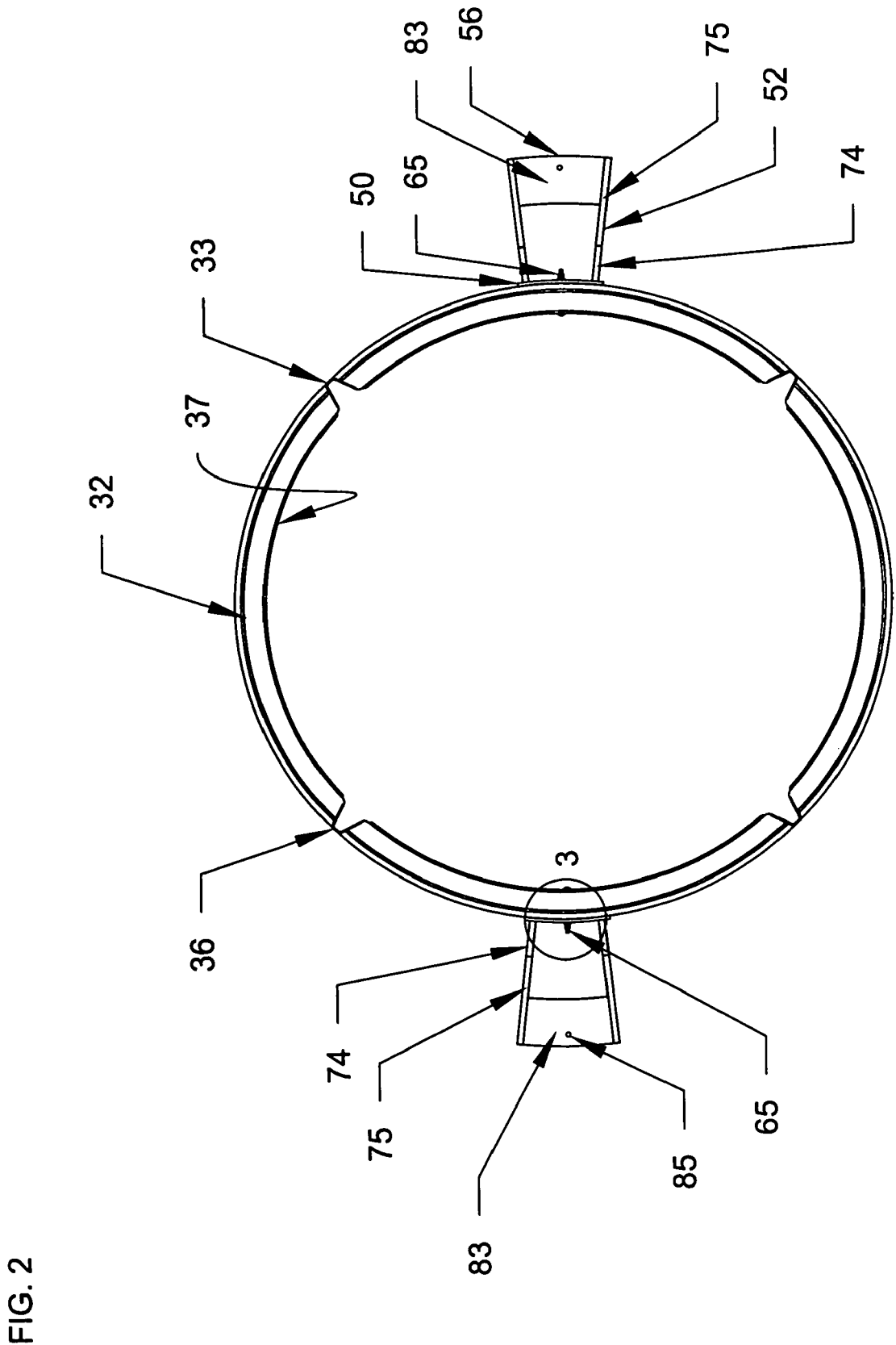
FIG. 2 is a front elevational view taken from in front of FIG. 1.
Figure 3:
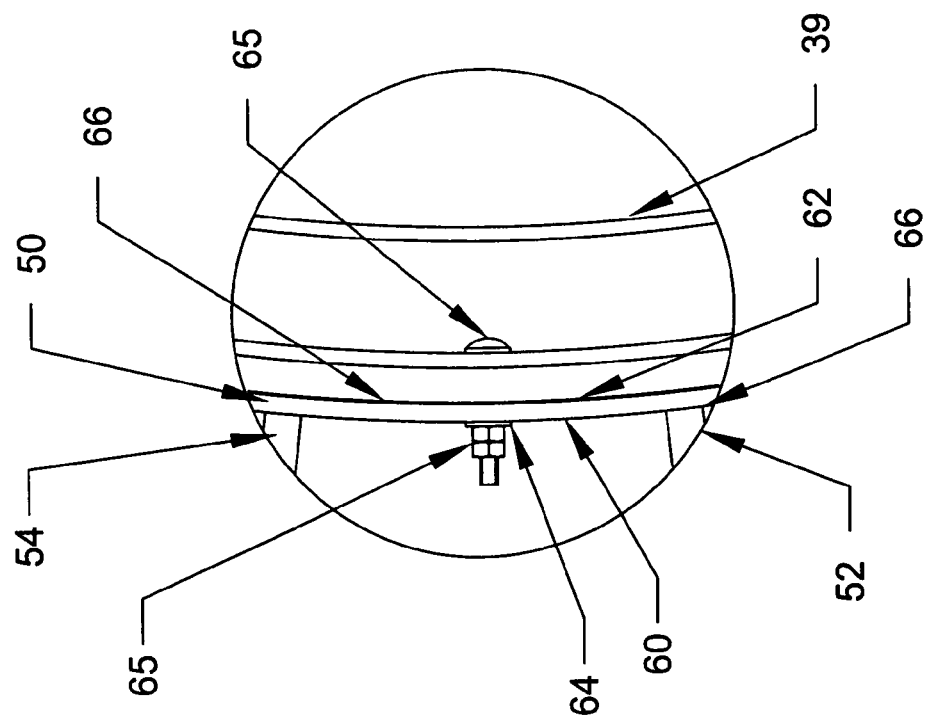
FIG. 3 is a front elevational view on an enlarged scale taken along line 3-3 of FIG. 2.

The bracket base 50 has an upper surface 60 and a lower surface 62 and is shown as having at least one fastener aperture 64 drilled therethrough as in the embodiment where such fastening means are used. Each such fastener aperture 64 is located on the base such that the cooperating base fastener 65 inserted therethrough also passes through the crown 38 of the coupler corrugation 37. Additionally, depending on the length of the bracket base 50, there could be a plurality of fastener apertures 64 such as is depicted in FIG. 6 where four are shown: one hole 64 for each directly adjacent coupler crown 38. With respect to each cooperating base fastener 65, it could be a nut and bolt or any other mechanical connection. The nuts could also be locking nuts. As shown in FIGS. 2 and 3, the head of the fastener is located adjacent the interior surface of the coupler corrugation in the valley thereof, with the shaft of the fastener extending outwardly through the split coupler and the bracket base where it is then fastened. In the preferred embodiment of the invention, the lower surface 62 of the bracket base 50 is adhesively secured or preferably welded 66 to the coupler crowns 38 on which it rests.

The bracket base 50 also has edges 68 and ends 69. The base is slightly curved as can be seen in FIG. 7, which also shows one fastener aperture 64 passing therethrough. This curvature is due to the curvature of the split coupler 30, which is also curved to conform to the curvature of the plastic pipe over which the split coupler is laid.

Extending upwardly from the bracket base, preferably from the upper surface thereof, are bracket sidewalls 52 and 54, each having an interior surface 70 and an exterior surface 72, the interior surfaces 70 facing each other. As can be appreciated from a comparison of FIGS. 1, 2, and 4, each bracket sidewall has a bottom edge 73 which is directly adjacent the bracket base plate 50. Each bracket sidewall is secured to the base 50, preferably by weld 66 or equivalent means.

Each bracket sidewall also has a side edge 74, with the embodiment shown in the drawings also having a beveled side edge 75 which extends between the side edge 74 and the top edge 76 of the bracket sidewall. Extending downwardly from the top edge 76 of the two bracket sidewalls shown is a sidewall slot 77a and 77b respectively. The slot has opposing sidewalls 78 and a slot bottom surface 79. While the opposing sidewalls 78 are shown as being essentially parallel to one another, it can be readily appreciated that in the preferred embodiment of the invention, the two bracket sidewalls are skewed with respect to each other as best shown in FIG. 2.

Turning now to the crosspiece 56, it can best be appreciated from a comparison of FIGS. 1, 2, 4, 5, 8, and 10. It has a top edge 80 shown as being slightly arcuate, a bottom edge 82 shown as being parallel to the top edge 80, front and rear sidewalls 83, and side edges 84. One of the sidewalls faces towards the concrete pipe to be joined.

At least one crosspiece aperture 85 is located nearer the top edge 80 than to the bottom edge 82, and approximately midway across the crosspiece. In FIG. 5, two crosspiece apertures are disclosed to enable a degree of adjustability. However, for most purposes it is believed that the closer the rod 24 is to the coupler and concrete pipe, the better. The thickness of the crosspiece is of a dimension slightly less than that of each of the slots in the bracket sidewalls. Thus, the first side edge portion of the crosspiece is retained in the slot of one of the bracket sidewalls while the second side edge portion of the crosspiece is retained in the slot on the opposite bracket sidewall. Preferably the crosspiece is further secured in the bracket by polyethylene welding of the crosspiece to the interior and exterior of both bracket sidewalls.

The crosspiece has a longitudinal axis which extends from bracket sidewall to bracket sidewall, while the bracket base plate 50 has a longitudinal axis that extends in the direction of the longitudinal axis of the plastic pipe. Thus it will be recognized that the longitudinal axis of the crosspiece is essentially perpendicular to that of the base plate. The connecting element 24 is secured to the bracket as can be appreciated from a comparison of FIGS. 8 and 10. The connecting element extends through the crosspiece aperture 85, with the threaded end of the connecting element being secured with washer 91a and nut 91b, with the nut being adjacent the side of the crosspiece facing away from the concrete pipe joined by the coupler 10.

In actual use, the split coupler is closed about the plastic pipe. Typically the plastic pipe 16 is at least 12' in length and often up to 20' in length. A sealing gasket of the type known in the art of plastic pipe is placed on the outer surface of the plastic pipe so that upon insertion the gasket effects a fluid-tight seal. The plastic pipe then has its end inserted into the end aperture 14 of the concrete pipe 11 such that the split coupler is preferably located completely outside of the concrete pipe itself.

The concrete anchor is positioned in the wall of the concrete pipe beyond the terminus of the inserted plastic pipe, so that the sealing gasket is between the concrete anchor and the end of the concrete pipe. The split coupler also may utilize fastening means 97 to secure at least one coupler section 32 to the plastic pipe 16 at aperture 95. The purpose behind the use of fastening means 97 is to seat the split coupler onto the corrugated pipe. Although only one aperture 95 is shown, additional ones could be utilized to provide for more points of direct attachment between the pipe and the split coupler. The rod 24 between the reinforced concrete pipe and the plastic pipe provides additional means to secure the plastic pipe to the concrete one.

During installation of the coupler of this invention, the location of the brackets should be kept in mind, so that the respective concrete anchors and bracket lie in a plane parallel to the longitudinal axis of the coupled pipes. The connecting element 24 is then passed through the crosspiece aperture and the one in the head of the concrete anchor and fastened in place.

During use, if shifting of the pipes occurs, upon the application of a significant predetermined level of stress, failure has been designed in one or more ways. One way is for the rod 24 to fail by using a small enough diameter or making it of a material such as plastic which when subjected to a predetermined level of stress results in failure. Another way to engineer for failure is by making the thickness of the bracket crosspiece thin enough to break upon being subjected to a predetermined level of stress. Still another way for the device to be engineered for failure is by selecting the band to be of a strength that will snap when exposed to sufficiently high pressure caused by expansion of the coupler due to internal pressure within the plastic pipe causing shifting of the coupler over the corrugations of the plastic pipe. In each of these scenarios, while attempts are made to keep the coupler in place so as to provide a seal between the concrete pipe and the plastic one, by engineering failure with respect to the coupler, while the coupler may suffer damage, no damage occurs to the two pipes which can be rejoined.

While the form of apparatus herein described constitutes a preferred embodiment of the present invention, it is to be understood that the invention is not limited to this precise form of apparatus and that changes may be made therein without departing from the scope of the invention which is defined in the appended claims.

What is claimed is:

1. A concrete pipe to plastic pipe coupler comprising
a plurality of sections connected to one another, each having an exterior surface and an interior surface, said sections fabricated to cooperatively surround a plastic pipe of a first outer diameter, each said interior surface being directly adjacent the plastic pipe of a first outer diameter,
at least two brackets, with one bracket being secured to said exterior surface of a section of said coupler adjacent a section of said coupler to which another bracket is secured, said brackets each having a base plate, a pair of sidewall plates attached to said base plate, and a crosspiece having a first end and a second end, each said first end in contacting relationship with one of said pair of sidewall plates, each said second end in contacting relationship with the other of said pair of sidewall plates,
a fastening means engaging a concrete pipe of a second outer diameter,
a connecting element having a first end portion secured to said fastening means and a second end portion secured to said crosspiece.

2. The coupler according to claim 1 wherein each section is corrugated having a plurality of crowns and troughs.

3. The coupler according to claim 1 wherein said sections are connected to each other by hinge means, said sections being of a first thickness, said hinge means being of a second thickness, said first thickness being greater than said second thickness.

4. The coupler according to claim 1 wherein each said base plate is welded to said exterior surface of said section to which it is secured.

5. The coupler according to claim 1 wherein each said base plate is secured by fastening means to said section to which it is secured.

6. The coupler according to claim 1 wherein said sidewall plates each have a slot formed therein, said crosspiece having its opposite ends retained in said slots.

7. The coupler according to claim 1 wherein said base plate has an upper surface and a lower surface, said lower surface being directly adjacent said coupler section, said upper surface having said sidewall plates projecting upwardly therefrom.

8. The coupler according to claim 7 wherein said sidewall plates each have a slot formed therein, said crosspiece having its opposite ends retained in said slots, said crosspiece having a longitudinal axis, said base plate having a longitudinal axis, said longitudinal axis of said crosspiece being generally perpendicular to said longitudinal axis of said base plate.

9. The coupler according to claim 1 wherein at least one section has an aperture formed therein, said aperture having fastening means passing therethrough, said fastening means also passing through the sidewall of the plastic pipe of the first outer diameter, said fastening means securing said section to the plastic pipe of the first outer diameter.

10. The coupler according to claim 1 wherein said crosspiece has an aperture formed therein, said crosspiece having a first surface facing towards said concrete pipe fastening means and a second surface facing away from said concrete pipe fastening means, said connecting element passing through said crosspiece aperture, said connecting element second end portion being secured with fastening means directly adjacent said second surface of said crosspiece.

11. A split coupler component of a concrete pipe to plastic pipe coupler, said split coupler comprising
a plurality of sections connected to one another, each having an exterior surface and an interior surface, said sections fabricated to surround a corrugated plastic pipe,
at least two brackets, with one bracket being secured to said exterior surface of a section of said coupler adjacent a section of said split coupler to which another bracket is secured, said brackets each having a base plate, a pair of sidewall plates attached to said base plate, and a crosspiece having a first end and a second end, each said first end in contacting relationship with one of said pair of sidewall plates, each said second end in contacting relationship with the other of said pair of sidewall plates, said crosspiece having an aperture formed therein.

12. The split coupler according to claim 11 wherein each section is corrugated having a plurality of crowns and troughs.

13. The split coupler according to claim 11 wherein said sections are connected to each other by hinge means, said sections being of a first thickness, said hinge means being of a second thickness, said first thickness being greater than said second thickness.

14. The split coupler according to claim 11 wherein each said base plate is welded to said exterior surface of said section to which it is secured.

15. The split coupler according to claim 11 wherein each said base plate is secured by fastening means to said section to which it is secured.

16. The split coupler according to claim 11 wherein said sidewall plates each have a slot formed therein, said crosspiece having its opposite ends retained in said slots.

17. The split coupler according to claim 11 wherein said said base plate has an upper surface and a lower surface, said lower surface being directly adjacent said coupler section, said upper surface having said sidewall plates projecting upwardly therefrom.

18. The split coupler according to claim 17 wherein said sidewall plates each have a slot formed therein, said crosspiece having its opposite ends retained in said slots, said crosspiece having a longitudinal axis, said base plate having a longitudinal axis, said longitudinal axis of said crosspiece being generally perpendicular to said longitudinal axis of said base plate.

* * * * *